April 19, 1966 J. P. NOLTA ET AL 3,247,423
SPARK DISCHARGE DEVICE WITH CONTROLLED GAP
Filed Feb. 6, 1963
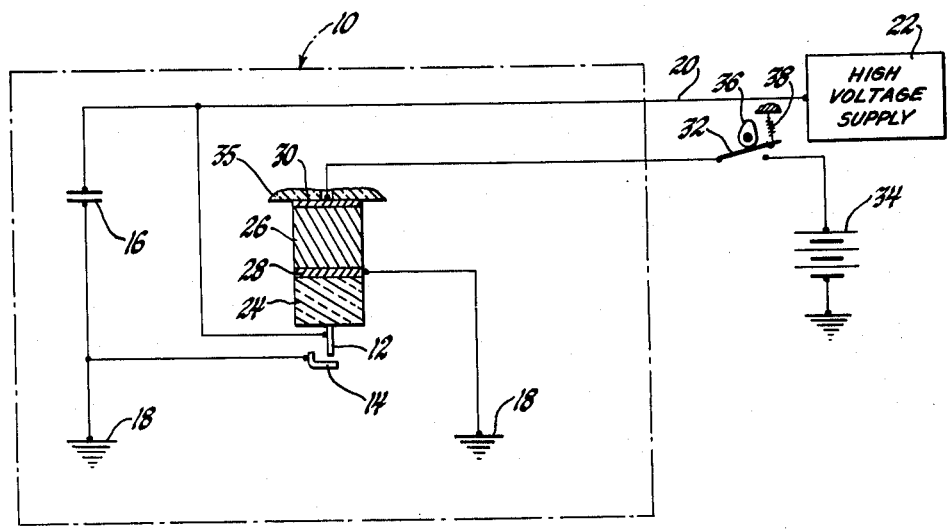
INVENTORS
James P. Nolta, &
BY Norman W. Schubring
Paul J. Ethington
ATTORNEY 3,247,423
SPARK DISCHARGE DEVICE WITH
CONTROLLED GAP
James P. Nolta, Detroit, and Norman W. Schubring, Birmingham, Mich., assignors to General Motors Corporation, Detroit, Mich., a corporation of Delaware
Filed Feb. 6, 1963, Ser. No. 256,739
4 Claims. (Cl. 315—357)

This invention relates to a device for producing a spark discharge across a pair of electrodes and, more particularly, to such a device in which the time of the discharge is controlled by purposefully displacing the electrodes relative to one another to thereby narrow the spark gap.

In the presently most popular system of spark distribution associated with internal combustion engines, a relatively high voltage pulse is produced by means of a transformer action and is transmitted through the interconnecting wire to the central electrode of a spark plug to cause a spark discharge between the central and lower electrode of the spark plug. This system requires the distribution of a high voltage pulse through lines which normally cause a rounding or time-elongation of the voltage pulses. This rounding-off of the pulse often causes improperly spaced or dirty electrodes to misfire, thus, promoting a decrease in the efficiency of the engine.

In accordance with the present invention, a new and useful sparking device is provided which does not require the distribution of high voltage pulses and, which, further, enhances the reliability of producing an intense spark even under adverse conditions. Briefly, this is accomplished by providing a pair of electrodes which are normally spaced a predetermined distance apart but of which at least one electrode is displaceable relative to the other such that the gap therebetween may be narrowed. Connected across the electrodes is a source of potential. This source of potential may take the form of a charged capacitor. The potential or the charge on the capacitor is such that when the electrodes are separated by the predetermined distance, the voltage thereacross is insufficient to produce a spark discharge between the electrodes. However, the voltage is of such a magnitude that by slightly narrowing the electrode gap the breakdown voltage intensity is exceeded and a spark discharge occurs. In order to displace the electrodes to narrow the gap, at least one of the electrodes may be mechanically interconnected with an expansible device which is adapted to displace the one electrode relatively toward the other upon application of a signal to the expansible device. This expansible element may conveniently take the form of a piezoelectric crystal which, when a relatively small voltage is applied across the crystal, will expand along a predetermined axis.

Further details of the invention are to be found in the following description of an illustrative embodiment of the invention taken with the accompanying figure which is a diagrammatic representation of the illustrative embodiment.

Referring to the figure, a sparking device 10 is seen to comprise a pair of electrodes 12 and 14 which are, as shown in the drawings, normally separated by a small gap across which it is intended to produce a spark discharge. This spark discharge may be advantageously used to ignite a combustible fuel mixture for the operation of an internal combustion engine. However, the invention is not so limited. Electrode 14 is permanently fixed in position while electrode 12 is displaceable toward electrode 14 as will become more apparent in the following.

Connected across electrodes 12 and 14 is a capacitor 16. One side of capacitor 16 and the electrode 14 are commonly connected to ground as indicated at 18. The other side of the capacitor 16 and also the other electrode 12 are connected by way of a conductor 20 to a high voltage supply 22 which is effective to maintain a charge across the capacitor of a predetermined magnitude. This magnitude is selected to be less than the charge required to cause an arc across the electrodes 12 and 14 with normal spacing therebetween.

As shown in the drawing, electrode 12 is mechanically mounted in an insulator 24 which may take the form of a block of ceramic material. Mechanically associated with the insulator 24 and, consequently, with electrode 12 is a piezoelectric element 26 disposed between a pair of electrode plates 28 and 30. Electrode plate 28 is connected to ground 18 as shown while electrode plate 30 is connected through a system of breaker points including a switch 32 to a low voltage source which may take the form of a standard 12-volt battery 34. The arrangement of elements 24, 26, 28 and 30 is such that all elements are in intimate rigid contact as suggested in the drawing.

It is well understood that when a mechanical pressure is applied to a piezoelectric element, there will appear a voltage across certain surfaces of the element. This voltage is due to a distortion of the lattice structure of the piezoelectric element which results in a redistribution of charge within the element. The converse effect is also known to exist; that is, the application of a voltage across a piezoelectric element will result in a distortion of the lattice structure and a resultant expansion of the element along a predetermined axis thereof. With this principle in mind a discussion of the operation of the present invention is facilitated.

With switch 32 open such that no signal is applied to the piezoelectric element 26, the electrodes 12 and 14 will be spaced a distance apart which is sufficient to prevent a discharge of the capacitor 16. When it is desired to fire the spark discharge device 10, switch 32 is closed to apply a signal across electrode plates 28 and 30. The resulting field across the element 26 causes it to expand. The combination of the piezoelectric element 26 and the electrode plates 28 and 30 is anchored against a fixed body 35 such that expansion of the element 26 is allowed only in the downward direction as shown in the drawing. This expansion then displaces the electrode plate 28 which bears against the insulator 24 to displace electrode 12 downwardly toward electrode 14. As the spacing between electrodes 12 and 14 decreases, the field intensity therebetween increases and the charge on capacitor 16 will, at some predetermined point, exceed that required to ionize the atmosphere between the electrodes 12 and 14. At this point, a spark discharge will occur. The signal applied across plates 28 and 30 may then be removed and the electrode 12 will resume its normal position. The supply 22 may then be energized to recharge the capacitor 16 and prepare the system for another cycle.

To adapt the sparking device 10 for operation with an internal combustion engine, it is necessary to provide a system of breaker points which will synchronize the operation of the switch 32 with the operation of the engine. A purely illustrative arrangement is shown in the figure to include a cam 36 which bears against the blade of switch 32 to periodically close the switch against the action of a spring 38 to apply the relatively low voltage signal from the battery 34 across plates 28 and 30.

While the present invention has been described with reference to a specific embodiment thereof, this description is not to be construed in a limiting sense, since various modifications of the invention will be apparent to those skilled in the art. For a definition of the invention, reference should be had to the appended claims.

What is claimed is:

1. Apparatus for producing a spark discharge including:
   a first electrode having a fixed position;
   a second electrode which is normally a predetermined distance from the first electrode but is displaceable relative thereto;
   means for applying a potential across the first and second electrodes, the predetermined distance between the electrodes being effective to prevent a discharge of the potential across the electrodes;
   a piezoelectric element mechanically interconnected with the second electrode and responsive to a signal voltage to expand thereby displacing the second electrode toward the first electrode to cause a discharge across the electrodes;
   and means to apply a signal voltage to the piezoelectric element.

2. Apparatus for producing a spark discharge including:
   a first electrode having a fixed position;
   a second electrode normally a predetermined distance from the first electrode but displaceable relative thereto;
   a capacitor connected across the first and second electrodes;
   means to charge the capacitor to a predetermined potential, the predetermined distance being sufficient to prevent a discharge of the capacitor across the electrodes;
   a piezoelectric element responsive to a signal voltage to expand;
   rigid insulator means interconnecting the piezoelectric element and the second electrode to displace the second electrode toward the first electrode upon expansion of the piezoelectric element thereby to discharge the capacitor across the electrodes;
   and means to apply the signal voltage to the piezoelectric element.

3. A spark discharge device for use with an internal combustion engine comprising:
   first and second relatively displaceable electrodes which are normally a predetermined distance apart;
   a capacitor connected across the electrodes;
   a source of electrical energy interconnected with the capacitor for charging the capacitor to a relatively high voltage, the predetermined distance being sufficient to prevent a discharge of the capacitor across the electrodes;
   a relatively low voltage responsive piezoelectric expandable element mechanically interconnected with one of the electrodes and adapted to displace said one electrode toward the other electrode upon application of a signal voltage to said element whereby the relatively high voltage causes a discharge across the electrodes;
   and means to periodically apply a relatively low voltage to the piezoelectric element.

4. A spark discharge device for use with an internal combustion engine comprising:
   a first electrode having a fixed position;
   a second electrode normally a predetermined distance from the first electrode but displaceable relative thereto;
   a capacitor connected across the electrodes;
   a source of electrical energy interconnected with the capacitor to charge the capacitor to a relatively high voltage;
   the predetermined distance being sufficient to prevent a discharge of the voltage across the electrodes;
   a piezoelectric element adapted to expand along a predetermined axis upon application of an electrical signal thereto;
   insulator means mechanically interconnecting the piezoelectric element and the second electrode and aligned with the predetermined axis of expansion to displace the second electrode toward the first electrode upon expansion of the element;
   and means to periodically apply a relatively low voltage across the piezoelectric element thereby to discharge the capacitor across the electrodes.

References Cited by the Examiner

UNITED STATES PATENTS

| 902,427 | 10/1908 | Mildebrath | 315—327 |
| 1,020,503 | 3/1912 | Holden | 313—126 |
| 2,607,024 | 8/1952 | Marwell et al. | |
| 3,032,683 | 5/1962 | Ruckelshaus | 315—209 |
| 3,110,824 | 11/1963 | Flanagan | 310—8.5 |

DAVID J. GALVIN, *Primary Examiner.*

JAMES D. KALLAM, JOHN W. HUCKERT,
*Examiners.*